7870X
J. Stroop,
Hydrant,
Patented Dec. 16, 1833.
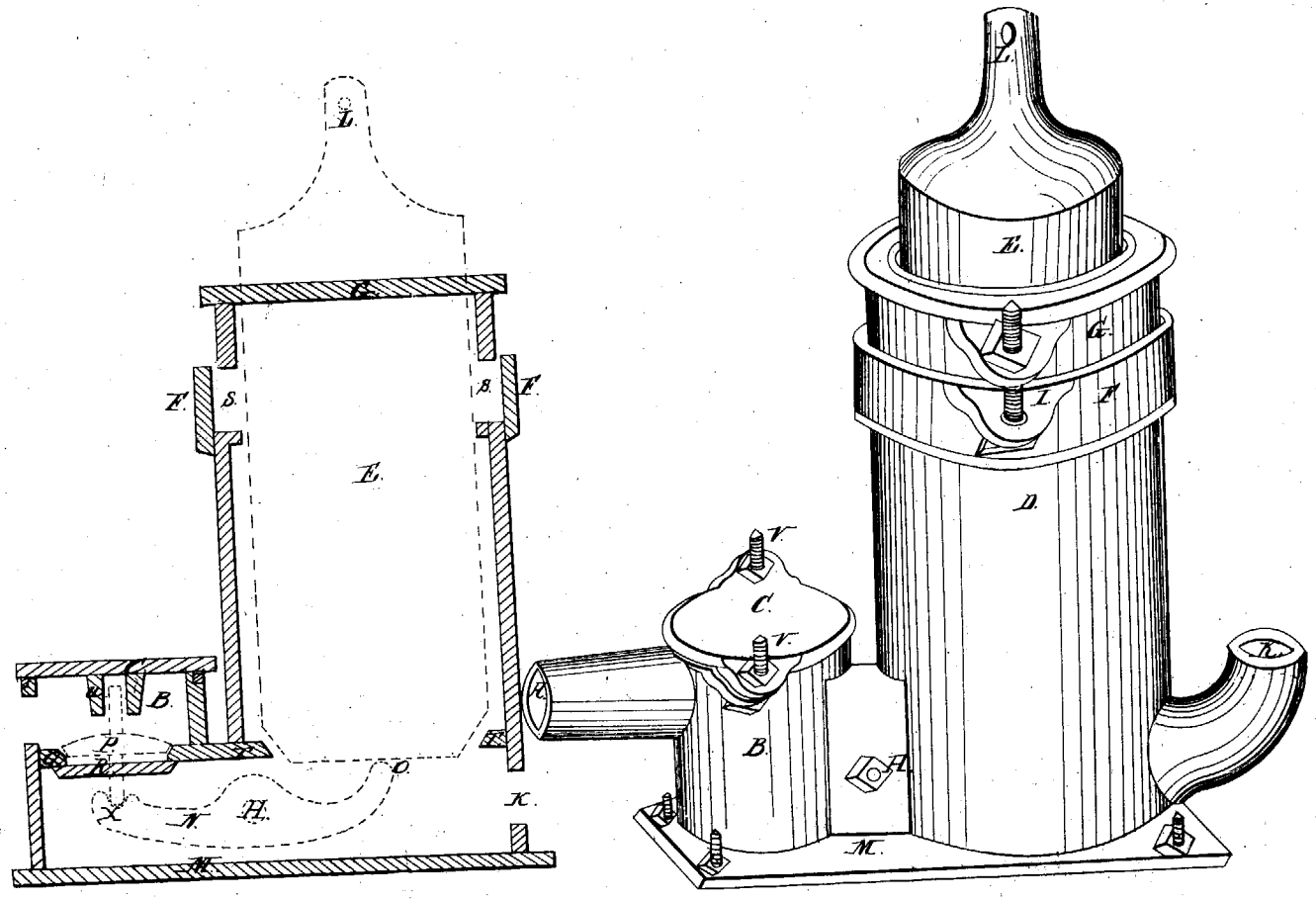
N. PETERS, PHOTO-LITHOGRAPHER, WASHINGTON, D. C.

7870X Dec 16, 1833

Jacob Stroop, Alleghany, Alleghany Co. Penn
Letters Patent Dated Dec. 16. 1833.

The Schedule referred to in these Letters Patent and making part of the same containing a description in the words of the said Jacob Stroop himself of his Improvement in the Hydrant.

---

To all to whom these presents shall come:
Be it known that I Jacob Stroop of the Borough of Alleghany of the County of Alleghany & State of Pennsylvania have invented a new & useful improvement in the hydrant & that the following is a full & exact description of the construction & operation of the said machine as invented or improved by me. D is a round cylinder which stands on end the upper end open, E. is a plunger which rises & falls by means of a lever or screw at the top of the hydrant box connected with a rod from the pin hole L. G. is a cap which bears on the packing at S.S. — F is the stuffing box which holds the packing. I is the screws which hold the cap G to packing, the packing is closely compressed around the plunger to be water tight. K. is a short piece of pipe to which the passing off pipe is attached to; the passing off pipe is the same as all other hydrant pipes made use of in the common way; M. is the bottom which closes the bottom of the whole machine; the before described machinery is not claimed as new machinery it being but the common force pump, the valve P is where the water is admitted through the machine from the main pipe, which is attached to the short pipe at A, this valve is also not claimed as a new principle of valve; N is a lever which is supported by the pin H & placed in the inside of box & so constructed when the plunger falls on the seat T.T. that it will be sufficiently pressed down at O. to raise the opposite end at X. to raise the valve P out of its seat at a.a. to pass off the water thro' the ma-chine. T.T. are the seat to prevent the plunger from falling lower than its proper distance to prevent injury done to the valve P: R is a guide bar for the lower end of the valve; U is also a guide for the upper stem of the valve; V.V. the screws which hold on the cap plate C; the whole of the machinery is to be placed in a wooden or metal hydrant box & made & put up in the usual way which hydrants are put up &c There is nothing new about the box it being the old plan of boxes &c, B is the chest called the valve chest.—

I claim the patent on account of arranging the old machinery in such man-ner & connecting it with other parts of the machine, so as to form a new kind of hydrant & applying the old machinery to a new purpose on account of its new connexion connexion together from any machine now in use. The object of the machine is to draw water from the pipes & conductors which convey water under ground to the places required, to prevent the freezing of water in the passing off pipe, & to prevent any leakage or wastage of water in the ground to effect that purpose.—

The operation of the machin-ery is thus; where water is required to be drawn,

7870X the hand is applied to the lever or screw at the head of the box which presses down the plunger E, and which displaces as much water from the cylinder D as its own bulk, & throws the water into the leading off pipe at the same motion it bears on the lever N at O so as to raise the valve P when the water will pass off, at the closing or stop=ping of the water, the lever or screw is moved the contrary way so as to cause the plunger to rise when the valve will be closed by the pressure of the water at the first movement of the plun=ger up, when the plunger will continue to rise & admit the water in the leading off pipe to re=cede from the pipe into the chest or cylinder D which will be placed in the ground below where it may be effected by frost &c.—

Witnesses
Will^m^ Locky
Wilson McCandless

Jacob Stroop 830 wds.

Exm^d^ [illegible]

Drawing also restored